(12) United States Patent
Bianchi et al.

(10) Patent No.: US 7,895,851 B2
(45) Date of Patent: Mar. 1, 2011

(54) METHOD FOR CONTROLLING HUMIDITY IN A DOMESTIC REFRIGERATOR, AND REFRIGERATOR ADAPTED TO CARRY OUT SUCH METHOD

(75) Inventors: Lorenzo Bianchi, Varese (IT); Alessandro Boer, Cassinetta Di Biandronno (IT); Enrica Monticelli, Varese (IT); Raffaele Paganini, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 441 days.

(21) Appl. No.: 12/032,201

(22) Filed: Feb. 15, 2008

(65) Prior Publication Data

US 2008/0196427 A1 Aug. 21, 2008

(30) Foreign Application Priority Data

Feb. 16, 2007 (IT) .............................. VA2007A0020
Apr. 26, 2007 (EP) ..................................... 07106982

(51) Int. Cl.
*F25B 49/00* (2006.01)
*F25D 17/06* (2006.01)

(52) U.S. Cl. .............................. 62/176.6; 62/180; 62/229

(58) Field of Classification Search ................. 62/176.1, 62/176.2, 176.3, 176.6, 180, 186, 228.1, 62/229
See application file for complete search history.

(56) References Cited

U.S. PATENT DOCUMENTS

| 2,485,894 | A | * | 10/1949 | Kuhn | ........................... 236/44 A |
| 5,377,498 | A | * | 1/1995 | Cur et al. | ........................ 62/187 |
| 2006/0130498 | A1 | * | 6/2006 | Joshi et al. | ....................... 62/127 |
| 2008/0179413 | A1 | * | 7/2008 | Shao | ............................ 236/44 C |

* cited by examiner

*Primary Examiner* — Marc E Norman
(74) *Attorney, Agent, or Firm* — John W. Morrison; Diederiks & Whitelaw PLC

(57) ABSTRACT

A method for controlling the humidity inside a refrigerator, having at least a cavity and a refrigeration circuit including an evaporator and a compressor, comprising the step of measuring the relative humidity level inside the cavity, measuring the temperature of the evaporator and feeding the above measured values to a control algorithm capable of driving the refrigeration circuit in order to maintain substantially constant the average level of relative humidity and corresponding to a set value.

6 Claims, 8 Drawing Sheets

METHOD FOR CONTROLLING HUMIDITY IN A DOMESTIC REFRIGERATOR, AND REFRIGERATOR ADAPTED TO CARRY OUT SUCH METHOD

BACKGROUND OF THE INVENTION

1. Field of the Invention

The present invention relates to a method for controlling the humidity inside a refrigerator, and a refrigerator adapted to carry out such method. The effectiveness of the food preservation performance of a refrigerator is mainly characterised by the level of its internal temperature and relative humidity level.

2. Description of the Related Art

In all the traditional domestic appliances the temperature is controlled by means of a dedicated temperature control system. Such control system is in general composed of one or more temperature sensors, one or more actuators (fan, compressors, etc), an user Interface allowing the customer to adjust the internal temperature and a temperature control algorithm. Such a traditional control algorithm will manage the cooling actuators according to the desired temperature and the actual temperature read by the sensor(s).

The internal relative humidity is not controlled in the known refrigerators and its level is the result of the following main factors:
- refrigerator load
- temperature control logic
- cooling system,
- user interaction (door opening length and frequency)
- external condition (temperature, relative humidity etc.)

The effects of these uncontrolled factors could get the internal refrigerator ambient too humid (with consequent undesired effects of condensation on the walls and with food damages, especially for the dairy products, due to build up of water on food surface and related quick growth of microorganisms which reduce the shelf-life of refrigerated products) or too dry (with consequent dehydration of food, loss of weight and change of its organolectic properties, especially for fruit and vegetables).

In both cases the user has no possibility of changing the degree of humidity inside the refrigeration compartment, being well known that a "no frost" refrigerator has usually a refrigeration compartment with a very low relative humidity while a refrigeration compartment of a "direct cool" refrigerator has usually a high relative humidity which is usually higher than the optimal value for food proper conservation.

SUMMARY OF THE INVENTION

It is therefore an object of the present invention to provide an innovative method to control both the temperature and the humidity inside a refrigerator cavity in order to maintain both of them at the desired and optimal level for food conservation.

This object is reached thanks to the feature listed in the appended claims.

Thanks to the method of the present invention, the user will be able to set not only the desired temperature inside the compartment, but also to set and control automatically the humidity level inside the refrigerator.

BRIEF DESCRIPTION OF THE DRAWINGS

Further advantages and features according to the present invention will be clear from the following detailed description, given as a non-limiting example, with reference to the appended drawings in which.

DETAILED DESCRIPTION OF THE PREFERRED EMBODIMENTS

Figure 1:
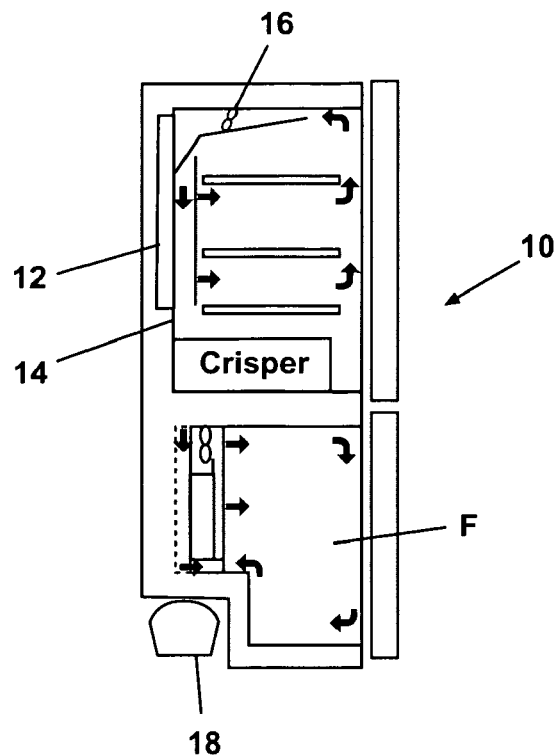
FIG. 1 is a schematic view of a double door refrigerator in which the control method according to the invention is implemented.

With reference to the attached drawings, a direct cooled double door refrigerator 10 comprises a direct cooled evaporator 12 on the back side of the liner 14, an air flow distribution system with a fan 16 blowing the air from the cavity to the evaporator side (the air flow distribution system being an optional and not critical for the invention), and a compressor 18 which provides the cooling capacity.

The freezer compartment F will not be taken in consideration since the humidity control is for the refrigeration cavity only. It is therefore irrelevant for the purpose of the present invention if the compressor can cool down both the evaporators (fridge and freezer) or just the fridge, for example by controlling the refrigerant flow with an electrovalve. In the present description we will consider only the evaporator 12 of the fridge compartment.

The traditional temperature control system (which doesn't consider the internal relative humidity) is in general based on the following idea:
- the compressor (and the fan if present) is switched on when the measured temperature (or a function thereof) is higher than a predetermined threshold (generally indicated as CUT-ON or switch-on temperature)
- the compressor (and the fan) is switched off when the measured temperature (or a function thereof) is below a predetermined temperature threshold (CUT-OFF or switch-off temperature).

Short phase lag between fan and compressor are in general possible to maximise the energy efficiency.

Figure 2:
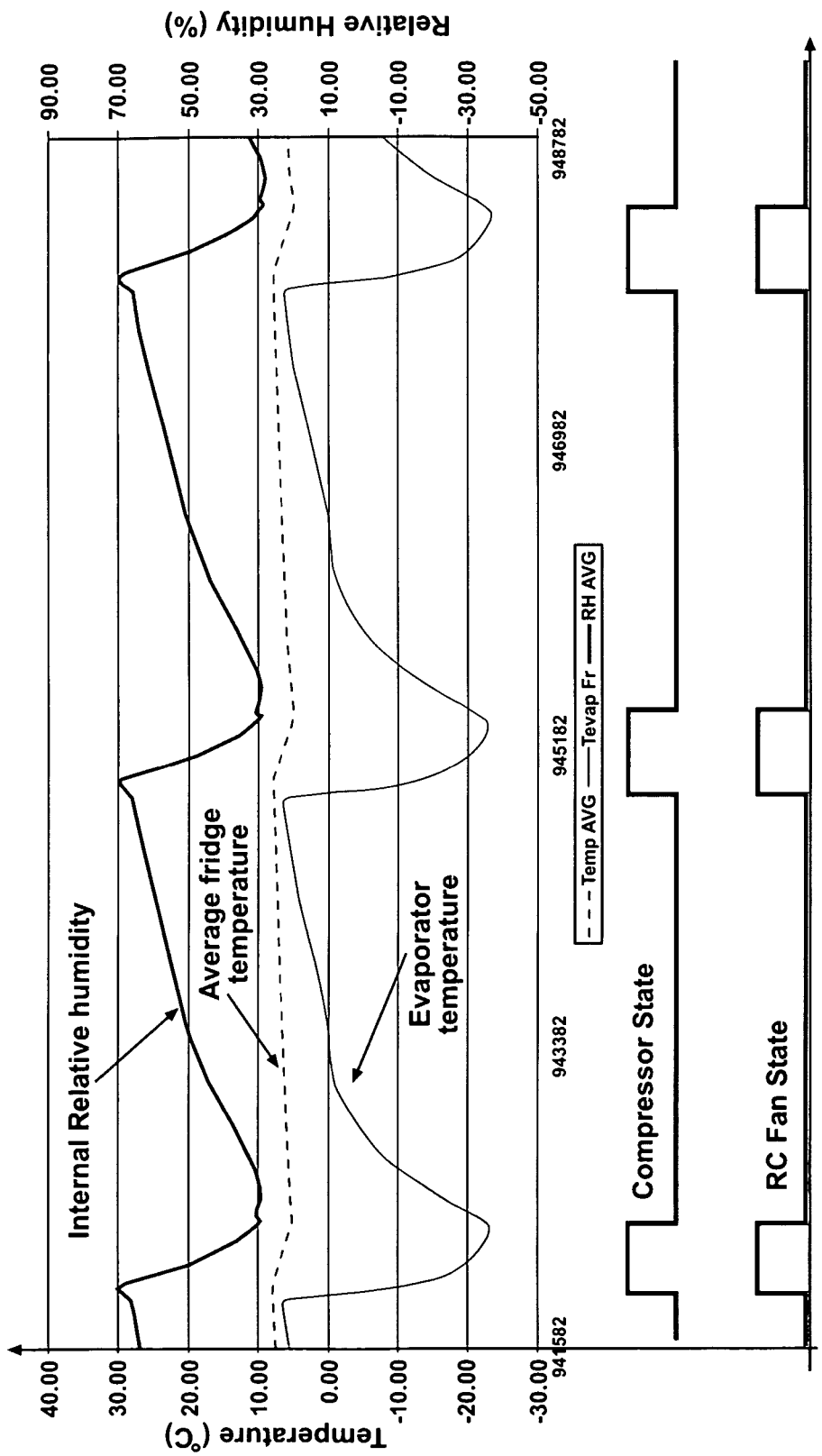
FIG. 2 is a diagram showing a typical humidity and temperature trend obtained with a traditional control system.

FIG. 2 shows a typical temperature and humidity trend resulting from such a traditional temperature control system. The average temperature trend is well controlled around 6° C. (according to the temperature settings). Nevertheless, the internal relative humidity has high variation within the 30% and 70% at each cooling cycle. In particular the figure highlight the well known behaviour according to which the humidity quickly drops down during the cooling phase of each cycle and than rises up during the warming cycle. So the average internal RH level is the results of the duration of the cooling phase respect to the entire cooling cycle. Such behaviour apparently seems to take to the conclusion that in such a refrigerator system is not possible to control both the humidity and the temperature. FIG. 2 suggests, in fact, that the humidity is the direct result of the internal temperature: the colder is the internal temperature required by the customer, the longer is the cooling phase at each cycle and by consequent the lower will be the internal humidity and its average at each cycle. On the contrary the higher will be the desired internal temperature, the shorter will be the cooling phase at each cycle and the higher will be the internal humidity.

One of the main features of the present invention consists in providing an internal humidity control without changing the internal average temperature in order to optimise the food preservation performances and without the use of any additional actuators but only the traditional ones (compressor and fan).

Figure 3:
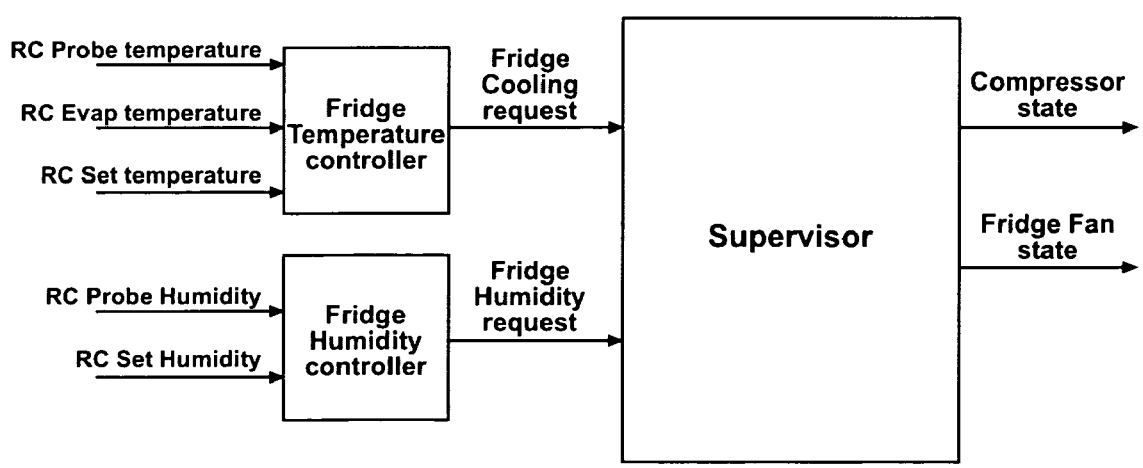
FIG. 3 is a block diagram representation of the control algorithm according to the present invention, which can implement the proposed idea of controlling simultaneously the temperature and the humidity inside the refrigeration cavity of refrigerator of FIG. 1.

The control system of a refrigerator according to the present invention (FIG. 3) comprises a supervisor (microprocessor) having as inputs the fridge control request coming from a fridge temperature controller and the fridge humidity request coming from a fridge humidity controller. The fridge temperature controller is fed with temperature values from a probe temperature (sensed inside the fridge cavity), from an evaporator temperature and from a set temperature inputted by the uses. The fridge humidity controller is fed with probe humidity (sensed inside the fridge cavity), with a set humidity inputted by the user or set in the factory.

The main concept supporting the present invention is based on the fact that the evaporator dehydrates the air during cooling phase. In this phase the vapour in the internal air condenses and freezes on the evaporator wall and the RH of the fridge cavity quickly decreases. During the warming phase the evaporator temperature rise up, the ice on the evaporator wall slowly melts and part of the water is discharged outside the cavity through the draining duct, and part of it returns to the air inside the cavity with a consequent relative humidity level increase.

This means that the warming phase provides an increase of both the internal temperature and the relative humidity. The cooling phase, on the other hands, has a double effect: It reduces the internal temperature (and this is good for the temperature control) and it drops down the internal relative humidity (and this is bad for the food preservation). The main limitation of the traditional control systems stands in this point: it seems not possible to cool down the internal cavity without drying it.

Figures 4A, 4B:
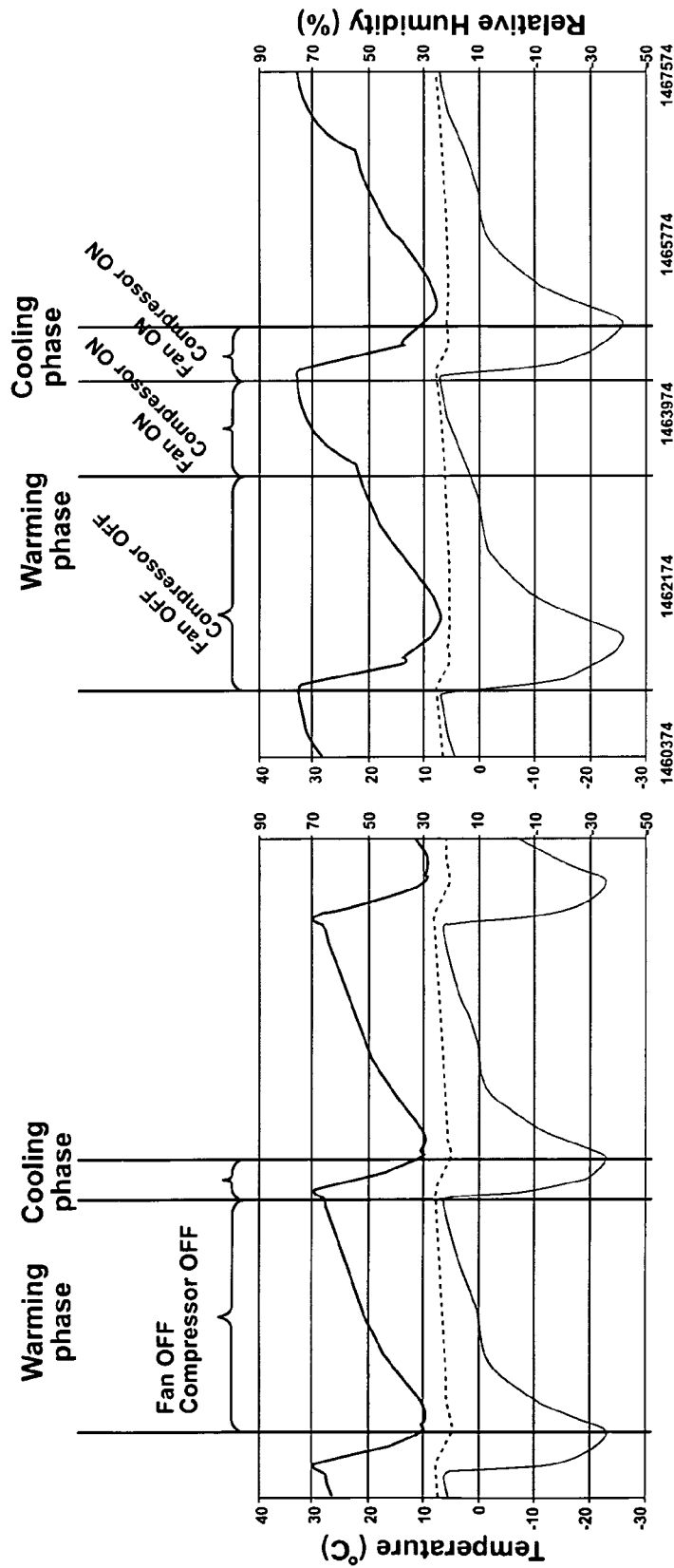
FIGS. 4a and 4b are diagrams showing the increase of average humidity level according to a first embodiment of the present invention.

According to a first embodiment of the present invention, the humidity level can be increased by increasing the switch-on temperature at a level higher than the one used in traditional refrigerators, and much higher than 0° C. (between 4° C. and 10° C., more preferably between 7° and 9° C.). According to this embodiment, the fan 16 is switched on during the traditional warming up phase (compressor off) when the evaporator temperature is higher than 0° C. (in this condition the evaporator ice is melt so that by switching on the fan it can distribute the "just melted ice" inside the cavity in the form of water vapour). According to this first embodiment the humidity level can be decreased by switching on the compressor and the fan when the evaporator temperature is at a predetermined value close or below 0° C. (preferably in the range −3° C. and 0° C., more preferably between −2° C. and −0.5° C.). Therefore in this "dehumidification" phase the working of the refrigerator is different from the traditional ones where switch-on temperature is above 0° C. Since the compressor is switched on when the evaporator temperature still allows an accumulation of ice on the evaporator itself, the overall humidity level inside the cavity is lowered. The result of this first embodiment in increasing the humidity level is shown in FIG. 4b, where FIG. 4a shows the situation in which the average relative humidity is lower than in FIG. 4b. The solution according to this first embodiment provides an appreciable increase in the maximum of the humidity at each cycle, even if it provides on the other hands a reduction of the minimum value. The average relative humidity level at each cycle has nevertheless an increase that is appreciable in term of food preservation performances. Moreover, according to this first embodiment the use of the fan is not strictly necessary (even if somehow preferred), and this concurs in having a refrigerator with an overall low cost.

According to a second embodiment of the present invention, in the humidification process the fan is switched on when the evaporator temperature reaches a predetermined value that is lower than the switch-on temperature at which the compressor too is switched on. The electronic control unit ("supervisor") switches off the compressor and the fan when the evaporator temperature is lower to a predetermined temperature linked to the temperature set by the user; the control unit switches on the fan when the evaporator temperature has reached the above intermediate predetermined value above 0° C.; the control unit switches on the compressor when the evaporator reaches a second predetermined temperature value higher than the first above intermediate one. In this second embodiment the above second temperature value is lower than the corresponding value of the first embodiment (humidification process) and it is preferably the "standard" switch-on temperature for the compressor, i.e. preferably comprised between −2° C. and 7° C., more preferably between 4° and 5°, while the intermediate (first) temperature value (for switching on the fan only) is preferably comprised between 0° and 3° C., more preferably between 0° and 1° C.

According to this second embodiment of the present invention, the dehydration of the cooling phase is controlled (according to the actual level of relative humidity, measured or estimated) and the re-hydration during the warming phase is controlled as well by acting on the cooling fan and the compressor separately, without changing the switch-on temperature of the compressor compared to traditional refrigerators. In other words this second embodiment consists in introducing a new cooling cycle characterised by three phases instead of the two traditional phases (cooling and warming phases). The three phases of the new cooling cycle according to this embodiment are here summarised:

Cooling storage phase: this phase is characterised by having the compressor switched on and the fan switched off. In this way the evaporator is cooled down. A cooling power is therefore stored in the evaporator and is not distributed to the cavity because the fan is off. This configuration of the fan (off) reduces the airflow along the evaporator side during its cooling phase and by consequence the air dehydration.

Cooling distribution phase: once the evaporator is cooled enough (i.e. once the stored cooling power is enough according to the appliance needs), the cooling distribution phase can start. This is obtained by switching off the compressor and, according to the humidity level request, by switching on the fan. In this phase the fan has a double effect: it cools down the cavity by transferring the stored cooling power from the evaporator to the cavity and it increases the humidity level by transferring the vapour coming from the ice warming-up and/or melting from the evaporator to the cavity. This phenomenon occurs only when the temperature of the evaporator starts to increase after the compressor is switched off. For this reason, the implementation of the proposed method could require to postpone the fan switch-on only when the evaporator temperature starts to increase in order to guarantee the maximum humidifying effectiveness. This can be obtained by comparing the time derivative of the evaporator temperature with a fixed threshold. An alternative solution could consist on waiting for a fixed time before switching on the fan after the compressor is switched off.

Warming phase: this phase is characterised by having the compressor switched off and the fan switched on or off according to the humidity request and the evaporator temperature, in particular the fan will be switched on if the appliance needs to be humidified and the evaporator temperature is warm enough.

In this way it is possible to create any of these four conditions:

Cool down and humidify, with the cooling distribution phase (not achieved with the traditional refrigerators).
Warm up and boost the humidification if in the warming phase: the evaporator fan will be constantly kept on.
Warm-up without humidifying (or with a reduced humidifying effect) if the fan and the compressor are maintained off during the warming phase.
Cool down and dehydrate by maintaining the fan on in the cooling storage phase (in this case the cooling storage phase and the cooling distribution phase coincide).

The temperature controller reads the temperature sensor(s) inside the cavity (such sensor could be placed for example on the evaporator and/or inside the cell). Such temperature readings, together with the user set temperature, are converted into a cooling request level. This conversion can be obtained by the use of standard control methods (proportional-integral PI, proportional-integral-derivative PIDs, hysteresis) or more advanced techniques (such as Neural-Fuzzy, or data fusion methods).

The humidity controller has the same function for the humidity control problems. It converts the relative humidity level (acquired by a dedicated sensor or inferred by temperature measures) and the desired humidity level (set by the customer or set in the design phase) into a humidity request level.

The supervisor activates one of the above mentioned phase according to the humidity request, cooling request and evaporator temperature (such temperature being either directly measured or inferred by a temperature measure inside the appliance cavity).

Figure 5A:
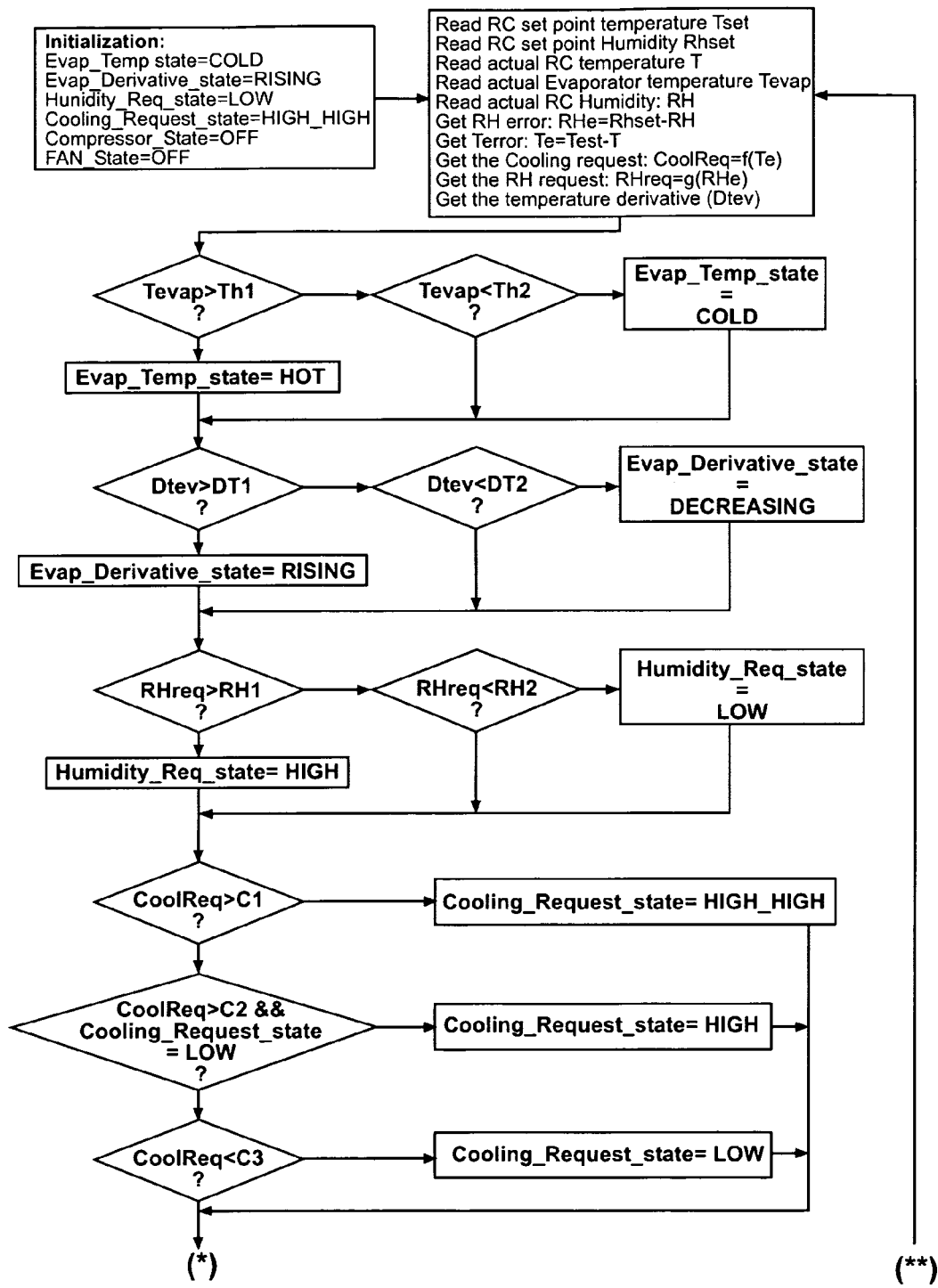
FIGS. 5a, 5b and 5c are parts of a flow chart showing the control algorithm according to a second embodiment of the present invention.
Figure 5B:
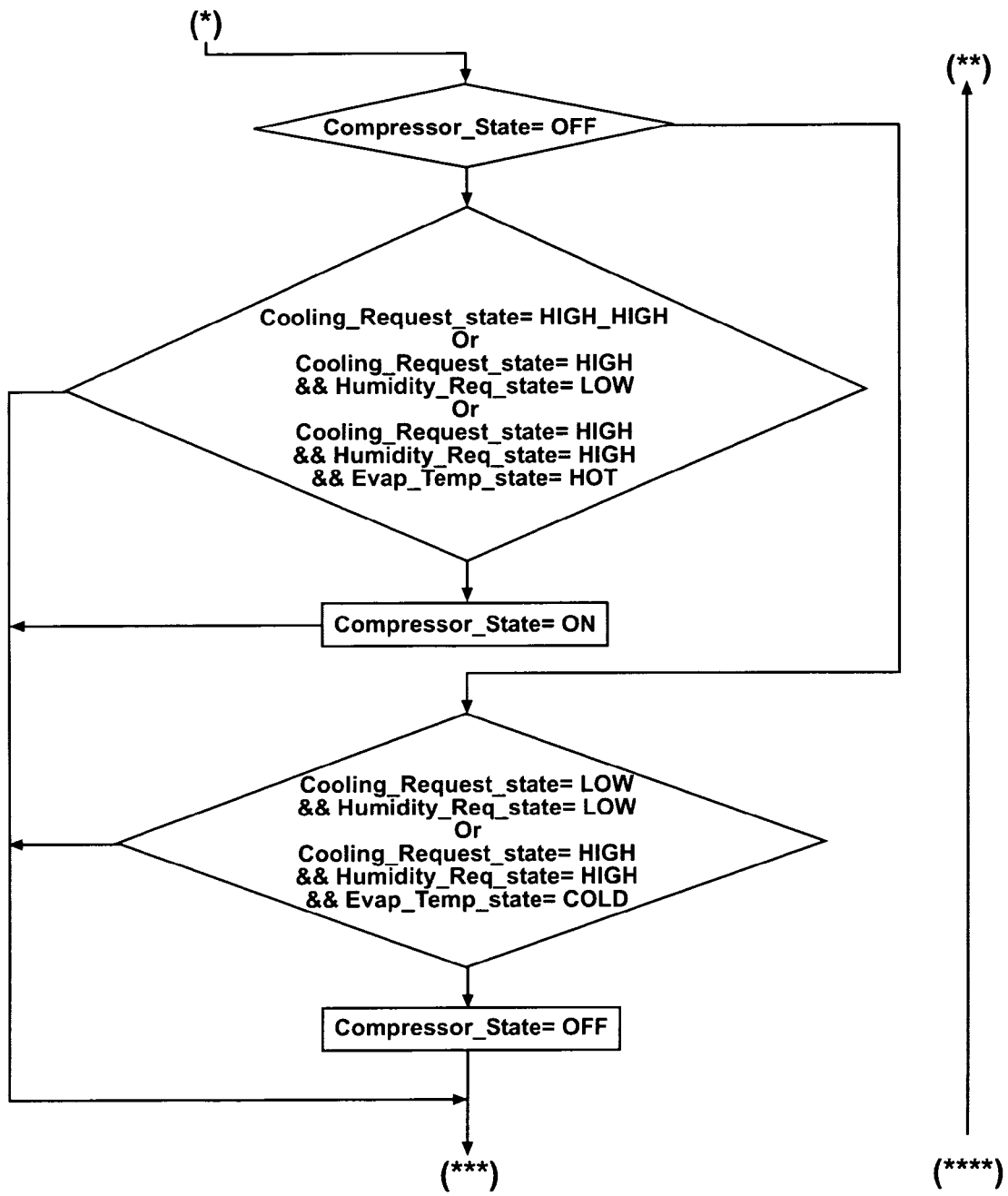
Figure 5C:
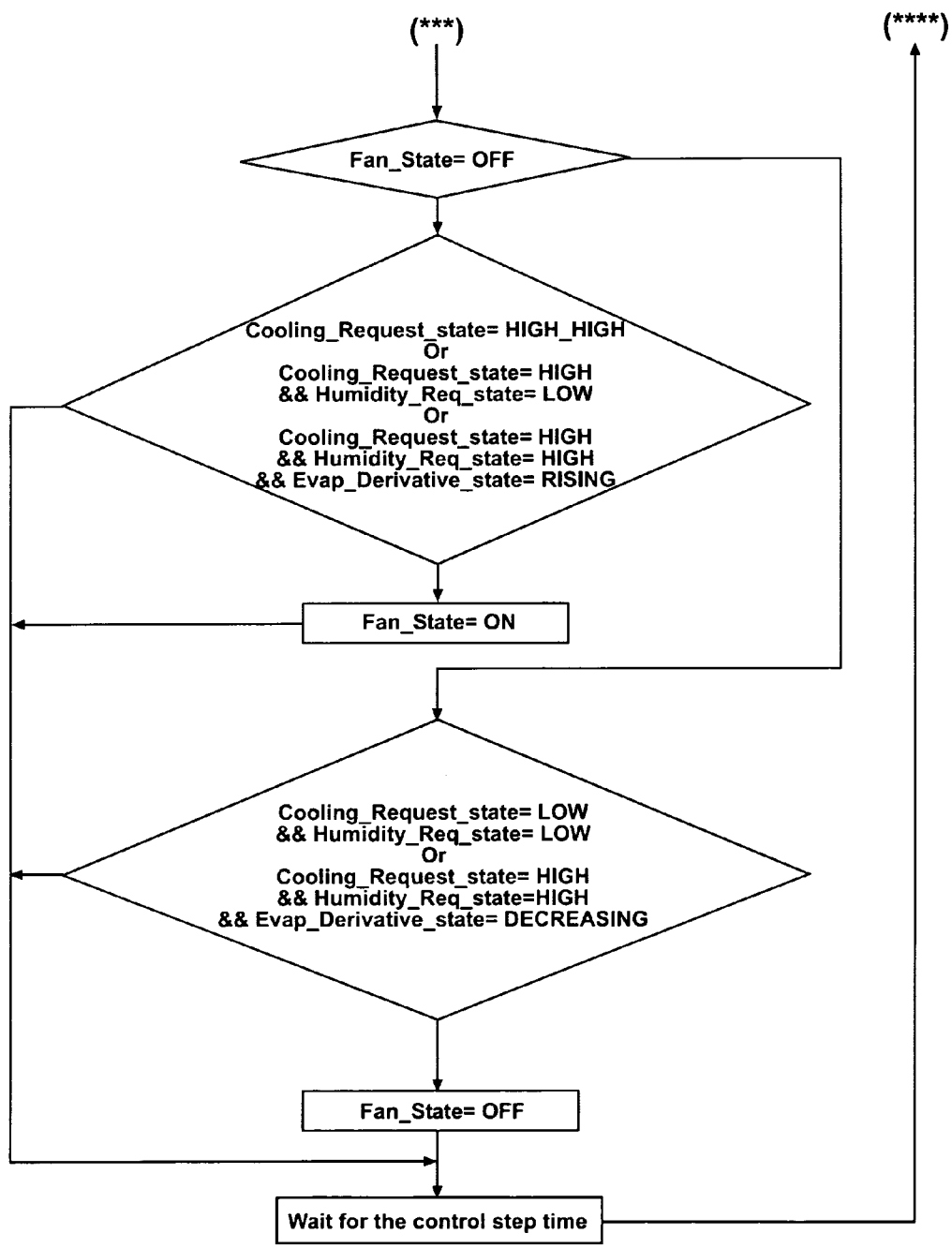

A more detailed implementation of the idea is showed by the flow chart of FIGS. 5a-5c.

According to the proposed implementation, the evaporator temperature is classified into two different states: "HOT" or "COLD". The actual state is decided according to an hysteresis logic applied to the evaporator temperature read from a dedicated sensor (or inferred with an indirect measure), between two values TH1 and TH2 defined during the algorithm design phase.

The evaporator temperature time derivative is classified into two different states: "RISING" or "DECRISING" according to an hysteresis logic between two different values DT1 and DT2, defined during the algorithm design phase.

The cooling request level (as a function of the difference between the set temperature and the measured temperature) is classified in three different states:

"HIGH_HIGH", this state represents a sort of warning condition characterised by a significant warm cavity, in this condition the control will ask for the maximum cooling power without considering any humidifying request.

"HIGH", this condition indicates a warm but controlled cavity. In this condition the controller could decide for the "cooling storage phase" or for the "cooling distribution phase", according to the evaporator temperature and the humidity request level. This aspect will be described with more detail later on in the description.

"LOW", this condition indicates a cold cavity. In this condition the controller could decide for the warming up phase with the compressor off and the fan on or off according to the evaporator temperature, its derivative and the humidity request level. This aspect will be described with more detail later on in the description.

The humidity request level is classified in two possible states:

"HIGH": in this state the inner refrigerator ambient is considered too dry. The control could so decide for the warming phase with the fan on or for the cooling storage, depending on the evaporator temperature state and the cooling request state.

"LOW": in this state the inner refrigerator ambient is considered humid enough or too humid. In this condition the control could decide for the cooling storage and distribution simultaneously (compressor on) with the fan on or, alternatively, it will decide for the warming phase (fan off and compressor off), according to the cooling request level state.

Figure 6:
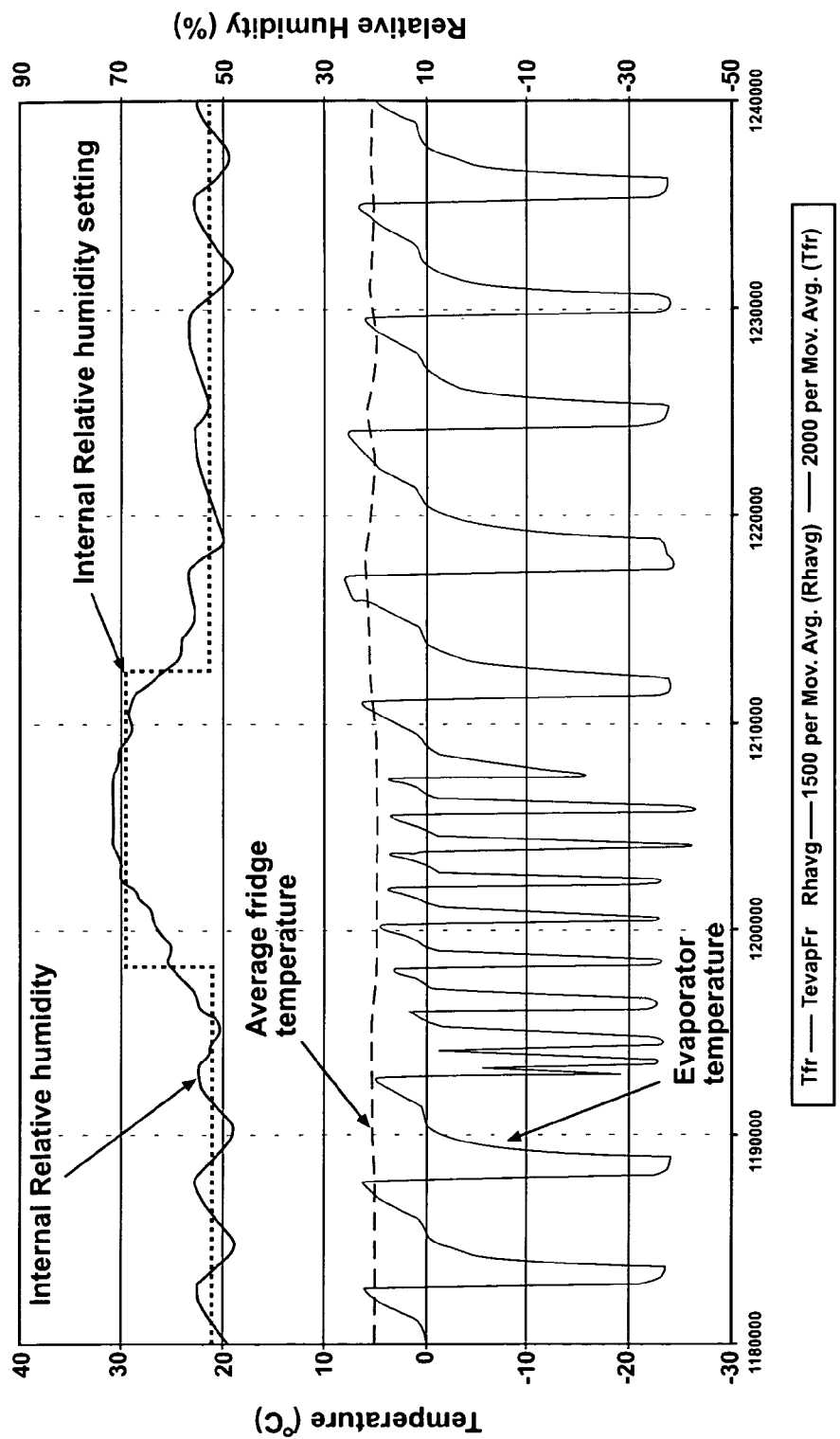
FIG. 6 show the result of an experimental test in which the control algorithm according to the second embodiment of the present invention react to two different changes in the relative humidity setting.

At the initialisation algorithm the control will initialises all the state variables:

Evap_temp_state=COLD (the evaporator temperature state is initialised as COLD)
Evap_Derivative_state=RISING (Evaporator time derivative initialised as Rising)
Humidity_Req_state=LOW
Cooling_Request_state=HIGH_HIGH
Compressor_State=OFF
FAN_State=OFF At each control cycle the control will execute the following operation:

1. Input reading:
   Read the cavity temperature (T) or the evaporator temperature (Tevap)
   Read the set temperature from the user interface (Tset)
   Convert the measured temperature (T) and its difference from the set temperature (Tset) into a cooling request (CoolReq) according to a pre-determined control method (PID, PI, Fuzzy-logic . . . )
   Read the Relative Humidity (RH) inside the cavity (or infer it by a temperature processing)
   Read the humidity level setting (Rhset) from the user interface (if the appliance doesn't provide the possibility of setting the humidity level on the U/I, a pre determined humidity level will be used).
   Convert the humidity level RH and its difference from the RHset into an humidity request Rhreq according to a pre-determined control method (PID, PI, Fuzzy-logic . . . )
   Compute the time derivative evaporator temperature (or infer it from indirect temperature measures).
2. Classification:
   The cooling request is classified into a cooling request state (HIGH HIGH, HIGH or LOW).
   The humidity request is classified into an humidity request state (HIGH or LOW)
   The evaporator temperature is converted into an evaporator state (COLD or HOT)
   The evaporator time derivative is converted into an evaporator time derivative state (RISING or DECRISING).
3. Actuation:
   Based on the above results of the classification phase the control will decide for the state of the compressor and the fan:
   The compressor will be switched from off to on under the following condition:
Cooling_Request_state=HIGH_HIGH or
Cooling_Request_state=HIGH && Humidity_Req_state=LOW
or
Cooling_Request_state=HIGH && Humidity_Req_state=HIGH && Evap_Temp_state=HOT The compressor will be switched from on to off under the following condition:
Cooling_Request_state=LOW && Humidity_Req_state=LOW
or
Cooling_Request_state=HIGH && Humidity_Req_state=HIGH && Evap_Temp state=COLD The fan will be switched from off to on under the following condition:
Cooling_Request_state=HIGH_HIGH
or
Cooling_Request_state=HIGH && Humidity_Req_state=LOW
or
Cooling_Request_state=HIGH && Humidity_Req_state=HIGH &&Evap_Derivative_state=RISING The fan will be switched from on to off under the following condition:
Cooling_Request_state=LOW && Humidity_Req_state=LOW
or
Cooling_Request_state=HIGH && Humidity_Req_state=HIGH &&Evap_Derivative_state=DECRISING FIG. 6 shows an experimental test of the proposed control algorithm and its performance in response to two different changes in the relative humidity level setting. It can be noticed the effectiveness of the control in increasing the internal relative humidity level in response to a change in the relative humidity level setting (for example through the user interface) and the same effectiveness in dehydrating the cavity (decreasing internal relative humidity level) in response to a reduction of the relative humidity level setting (again, for example, through the user interface).

Figure 7:
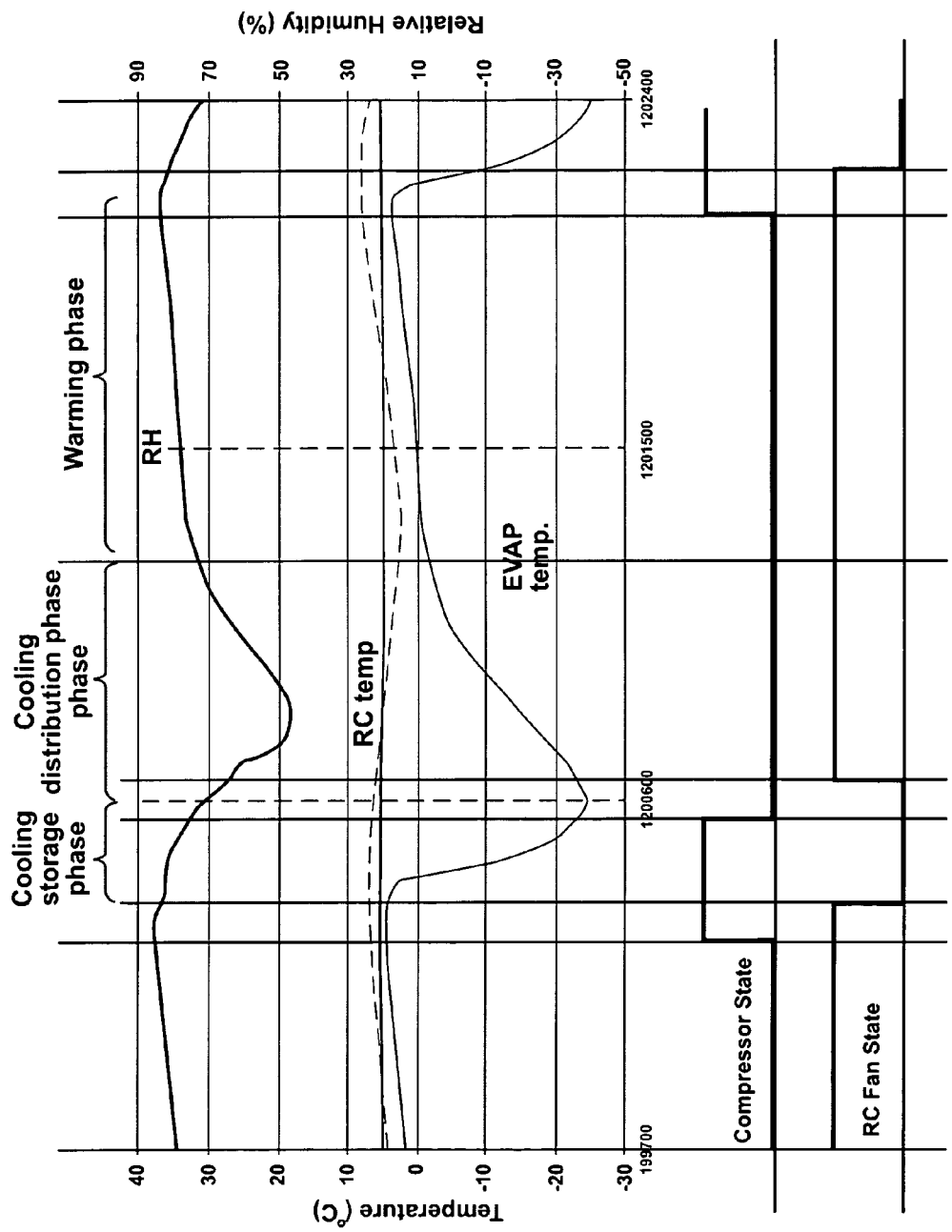
FIG. 7 highlights the three cooling phase of the algorithm of FIG. 5.

FIG. 7 shows a detail of a generic cooling cycle, according to the second embodiment of the invention, where the above mentioned three cooling phases (cooling storage, cooling distribution and warming up) are clearly indicated.

It is important to remark that the definition of the above three phases is fundamental in guaranteeing a controlled humidity without affecting the internal average temperature.

The technical solution underling the present invention could be extended also to no frost evaporators in the sense that the ventilation of this evaporator, when its temperature time derivative is positive, contributes to increase the internal humidity level as for the direct cooled evaporators. In the same way, the dehydration of a no frost refrigerator can be provided by switching on the fan when the time derivative of evaporator temperature is negative, according to the proposed invention.

The technical solution according to the present invention has been described having the main focus on a traditional appliance with just the basic actuators (compressor and single speed fan as main components of the refrigeration circuit). This has been done to highlight the cost effectiveness of the present invention. It is important to point out that additional actuators can improve the performances of the solution in terms of humidity controllability. One of the possible actuators that could improve the effectiveness consists in a low power heater on the evaporator. In this case the humidification during the above-defined warming phase will be more effective. Possible further improvements could come from the use of a variable speed fan. In this case the speed of the fan during the cooling distribution phase and during the warming phase will be set according to the humidity request provided by the humidity control block. This use of such further actuators has to be intended as part of the invention.

The innovative cooling cycle (composed of three phases) could have the drawback of energy efficiency reduction (by running the compressor with the fan off, in the cooling storage phase, the evaporator temperature reaches very low values with consequent reduction in the compressor efficiency). Such kind of problem can be easily addressed by activating the humidity control only when required by the customer. Such kind of humidity control could be deactivated, and the traditional control could be restored, after a long period of no door opening.

The internal humidity setting controlled by the algorithm according to the present invention can be set directly by the customer by means of the appliance user interface or can be internally set in the electronic control.

The internal humidity level can be displayed on the user interface in terms of relative humidity percentage or in terms of a discrete level (for example high, medium or low). In addition to this information the user interface can also indicate the decision taken by the electronic control in terms of actuators states (fan on o off) or in terms of control actions ("humidification in progress" or "dehydration in progress"). This kind of information could be provided either in terms of text or in terms of icons or led according to the user interface technology.

We claim:

1. A method for controlling the humidity inside a refrigerator, the refrigerator comprising at least a cavity and a refrigeration circuit including a fan inside the cavity for allowing a forced air circulation inside the cavity, an evaporator and a compressor, the method comprising:
   measuring, directly or indirectly, a relative humidity level inside the cavity;
   measuring, directly or indirectly, a temperature of the evaporator; and
   feeding the relative humidity level and evaporator temperature to a control algorithm capable of driving the refrigeration circuit in order to maintain an average level of relative humidity substantially constant and corresponding to a set value, wherein the humidity is controlled inside the refrigerator cavity by acting on the compressor and the fan so that a cooling cycle is provided which is composed of three main phases:
   a cooling storage phase in which the fan is off and the compressor is on;
   a cooling distribution phase in which the fan is on with the compressor on until the evaporator has reached a first predetermined temperature; and
   a warming phase in which the compressor is off, the evaporator has reached a second predetermined temperature higher than the first predetermined temperature and the fan is on or off according to the relative humidity level inside the cavity compared to the set value.

2. The method according to claim 1, wherein humidification of the refrigerator cavity is provided during the cooling distribution phase or during the warming phase by switching on the fan when a time derivative of the evaporator temperature is greater than a fixed positive threshold.

3. The method according to claim 2, wherein dehydration of the refrigerator cavity is provided by switching on the fan during the cooling storage phase or the cooling distribution phase when the time derivative is lower than a pre-determined negative threshold.

4. A method for controlling the humidity inside a refrigerator, the refrigerator comprising at least a cavity and a refrigeration circuit including an evaporator and a compressor, the method comprising:
   measuring, directly or indirectly, a relative humidity level inside the cavity;
   measuring, directly or indirectly, temperature of the evaporator; and
   feeding the relative humidity level and evaporator temperature to a control algorithm capable of driving the refrigeration circuit in order to maintain an average level of relative humidity substantially constant and corresponding to a set value, wherein the refrigeration circuit is driven according to the following steps:
      if the relative humidity level is lower than the set value and if the evaporator temperature is lower than a pre-determined value, driving the refrigeration circuit in order to increase the evaporator temperature in order to allow a thawing of frost accumulated on the evaporator; and
      if the relative humidity level is higher than the set value and if the evaporator temperature is higher than 0° C., driving the refrigeration circuit in order to decrease the evaporator temperature in order to allow a condensation and frosting of water vapour on the evaporator.

5. A refrigerator comprising:
   a cavity;
   a refrigeration circuit including an evaporator, a compressor and a fan adapted to create air circulation inside the cavity;
   a humidity sensor inside the cavity;
   a temperature sensor for detecting a temperature of at least one of an inside of the cavity and the evaporator; and
   an electronic control unit for driving the refrigeration circuit in order to keep the humidity level substantially constant and corresponding to a predetermined set value, wherein the electronic control unit is adapted to perform the following steps:
      if the relative humidity level is lower than the set value and if the temperature is lower than a predetermined value, driving the refrigeration circuit in order to increase the temperature in order to allow a thawing of frost accumulated on the evaporator;
      if the relative humidity level is higher than the set value and if the temperature is higher than 0° C., driving the refrigeration circuit in order to decrease the temperature in order to allow a condensation and frosting of water vapour on the evaporator.

6. A refrigerator comprising:
   a cavity;
   a refrigeration circuit including an evaporator, a compressor and a fan adapted to create air circulation inside the cavity;
   a humidity sensor inside the cavity;
   a temperature sensor for detecting a temperature of at least one of an inside of the cavity and the evaporator; and
   an electronic control unit for driving the refrigeration circuit in order to keep the humidity level substantially constant and corresponding to a predetermined set value, wherein the electronic control unit is adapted to drive the compressor and the fan so that a cooling cycle is provided which is composed of three main phases:
   a cooling storage phase in which the fan is off and the compressor is on;
   a cooling distribution phase in which the fan is on with the compressor on until the evaporator has reached a first predetermined temperature; and
   a warming phase in which the compressor is off, the evaporator has reached a second predetermined temperature higher than the first predetermined temperature and the fan is on or off according to a level of humidity inside the cavity compared to the set value.

* * * * *

UNITED STATES PATENT AND TRADEMARK OFFICE
CERTIFICATE OF CORRECTION

| | |
|---|---|
| PATENT NO. | : 7,895,851 B2 |
| APPLICATION NO. | : 12/032201 |
| DATED | : March 1, 2011 |
| INVENTOR(S) | : Bianchi et al. |

It is certified that error appears in the above-identified patent and that said Letters Patent is hereby corrected as shown below:

Col. 9, claim 4, lines 7 and 8, the phrase "temperature of the evaporator" should read --a temperature of the evaporator--.

Signed and Sealed this
Twentieth Day of December, 2011

David J. Kappos
*Director of the United States Patent and Trademark Office*